June 23, 1942.                R. B. KINZBACH                2,287,432
                              PIPE HOLDING SLIP
                           Filed Dec. 7, 1940            2 Sheets-Sheet 2

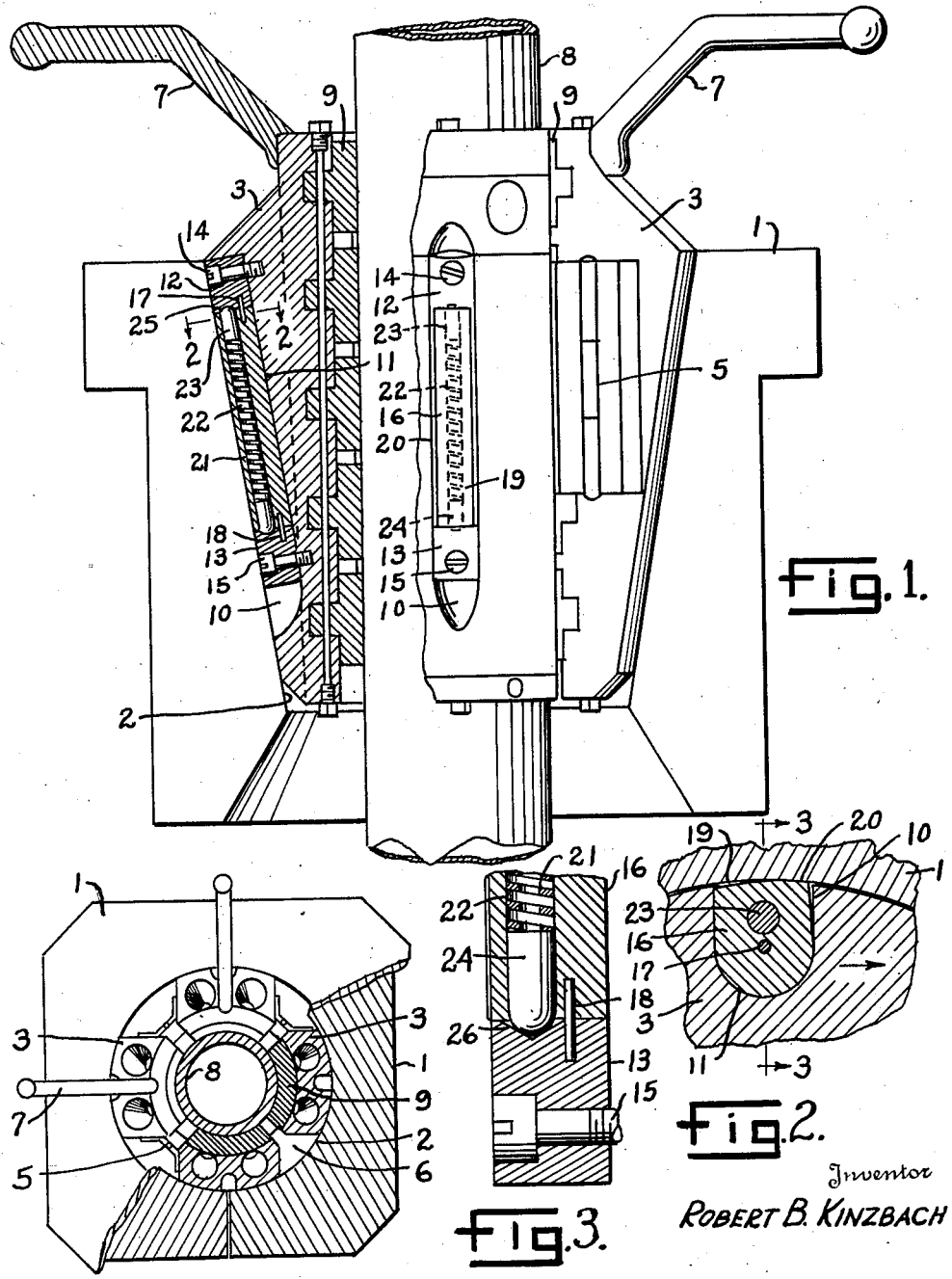

Inventor
ROBERT B. KINZBACH
By
E. V. Hardway
Attorney

Patented June 23, 1942

2,287,432

UNITED STATES PATENT OFFICE 2,287,432

PIPE HOLDING SLIP

Robert B. Kinzbach, Houston, Tex.

Application December 7, 1940, Serial No. 368,993

14 Claims. (Cl. 24—263)

This invention relates to a pipe holding slip.

This application is a continuation, in part, of application serial No. 287,685, for Pipe holding slip filed by applicant on August 1, 1939.

An object of the invention is to provide a slip of the character described specially designed for supporting a pipe suspended in a well with means for holding the slip against rotation in the slip bowl upon application of a torsional strain to the pipe which is supported by the slip, as for example, when a tong is applied to the pipe to break or make up a tool joint connecting sections of the pipe.

It is another object of the invention to provide a slip of the character described having means for locking the slip against rotation in the bowl effective to also increase the gripping effect of the slip on the pipe so as to prevent rotation of the pipe in the slip.

It is another object of the invention to provide, in a slip, locking means normally held in neutral position and arranged to be automatically moved to locking position, upon application of torsional strain to the pipe and which will automatically return to neutral position when said torsional strain is relieved.

It is a further object of the invention to provide, in a slip, locking means arranged when in neutral position to co-act with the slip segments to transmit the load of the pipe to the slip bowl or slip adapter.

It is a further object of the invention to provide a pipe engaging slip formed of segments, each segment comprising a gripping member and having a tapered outer surface shaped to fit into a tapered bowl or adapter and having a hinged connection with the gripping member and so mounted that the gripping member cannot rotate about the bowl.

A further object is to provide a novel type of hinged connection between the slip segments.

It is a further object of the invention to provide the combination with a pipe holding slip shaped to be fitted into a bowl or adapter of a locking cam engageable with the bowl to prevent rotation of the slip in the bowl.

In one embodiment of the invention each slip segment is formed of an inner, or gripping, part engageable with the pipe to be held, and an outer part shaped to engage with the bowl with cam-like effect, said parts being connected together to pivot on a longitudinal axis whereby a clamping force is set up to resist relative rotation of the pipe and bowl.

In well drilling operations the pipe or tubing in the well is often suspended by means of a wedge shaped slip fitted into a downwardly tapering bowl or adapter and engaging about the pipe to be suspended. In lowering the pipe into the well the pipe is made up, a section at a time, by screwing additional sections onto the upper end of the pipe and gradually lowering the pipe as additional sections are added. In breaking up the pipe it is intermittently elevated and the upper sections are unscrewed one at a time, as the pipe is elevated, and laid aside. During the operations of screwing sections onto the pipe or unscrewing sections therefrom the suspended pipe is held by the slips. At the present time it is common practice to use two sets of tongs one to hold the suspended string against turning and the other to turn the section to be screwed onto or unscrewed from, the suspended string.

It is the prime object of the present invention to provide a pipe slip that will not only hold the pipe suspended but will also hold the same against turning while screwing a section on the upper end thereof or unscrewing a section therefrom, to the end that only one tong need be used while making up or breaking out the string.

With the above and other objects in view the invention has particular relation to certain novel features of construction, operation and arrangement of parts, examples of which are given in this specification and illustrated in the accompanying drawings, wherein:

Figure 1 shows a side elevation of the slip, shown partly in section, and mounted in the slip bowl and supporting the pipe.

Figure 2 shows an enlarged, fragmentary, cross-sectional view taken on the line 2—2 of Figure 1.

Figure 3 shows an enlarged, vertical, sectional view taken on the line 3—3 of Figure 2.

Figure 4 shows a plan view, shown partly in horizontal cross-section.

Figure 6:
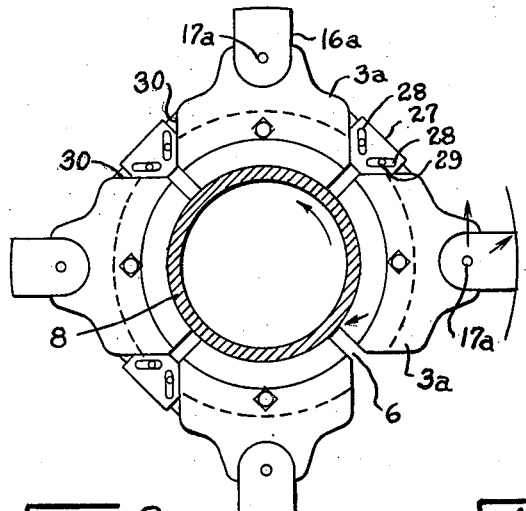
Figure 6 shows a top plan view thereof.

Referring now more particularly to the drawings wherein like numerals of reference designate the same parts in each of the figures, the numeral 1 designates a slip bowl, or slip adapter, formed of two complemental sections, as shown in Figure 4, and having a downwardly converging, inside seat 2, The slip is made up of a plurality of segments 3 whose outer surfaces are tapered to conform to the taper of, and to fit closely against the seat 2. As shown the slip assembly comprises four segments hinged together by the hinges 5 but open at one side 6 so that the assembly may be swung open in releasing the same from the pipe or closed together about the pipe and seated on the bowl as shown in Figure 4. It is, of course, obvious that the number and arrangement of the segments may be varied. As illustrated the slip assembly may be handled by the handles 7. The inner sides of the segments may be of any conventional form so as to fit closely about, and grip, the pipe 8 to be held. As shown the inner sides of the segments have the removable pipe gripping jaws 9 thereon whose inner surfaces should be knurled or roughened for a better gripping effect.

The outer side of each segment is shown formed with a longitudinal groove 10. The bottom of each groove or a semi-cylindrical bearing 11 and each groove is slightly flared outwardly as shown in Figure 2 and as also illustrated in Figure 4. Fitted into and secured in the upper and lower ends respectively of each groove are the upper and lower bearing blocks 12 and 13 which may be secured in place in any preferred manner, as by set bolts 14, 15. In the grooves 10 are the cams 16. As will be noted from an inspection of Figures 2 and 4 the seat 2 is circular in horizontal cross-section and the outer sides of the segments 3 are curved to correspond to the curvature of the seat 2. The inner sides of the cams 16 are curved to snugly fit into the corresponding semi-cylindrical bearings 11 and the outer surfaces of the cams are curved to correspond to the curvature of the outer surfaces of the corresponding segments 3 so that when the cams are in neutral position their outer surfaces will be flush with the corresponding outer surfaces of the segments. The upper and lower ends of the cams are pivotally connected to the corresponding blocks 12, 13 by means of pivot pins 17, 18. These pins are seated in corresponding sockets in the ends of the cams and in the adjacent blocks 12, 13. These pivot pins are located approximately at the center of the corresponding bearings 11. The sides of the cams are approximately parallel so that the cams will be somewhat narrower than the outer portions of the grooves 10 to permit a slight oscillation of the cams about the pivot pins whereon they are mounted. It will be noted that the axis of rotation of each cam is located radially inwardly of the longitudinal center of the cam. Each cam therefore has two longitudinal, operative cam faces 19, 20.

Upon application of torsional strain to the pipe 8 in a clockwise direction the slips will tend to turn in the direction indicated by the arrow in Figure 2 whereupon the cam face 20 of each of the cams 16 will immediately engage and grip the wall of the seat 2 thus preventing the slip from turning in the bowl.

Should a torsional strain be exerted on the pipe in the opposite direction or to the left the cam faces 19 will immediately grip the inner wall of the bowl to prevent the slips from turning with the pipe. Each cam 16 has sufficient rocking, or oscillating, movement above the pivot pins to permit this. When the cam faces 19 or 20, of all the cams, are in engagement with the seat of the slip bowl and are locking and holding the slip against rotation there will, at the same time, be a radial inward thrust exerted against the corresponding slip segments causing the slip to more securely grip and hold the pipe therein.

Provision has been made for normally maintaining the cams 16 in neutral position. For this purpose each cam is provided with a longitudinal bore 21 from end to end thereof in which are seated the coil pressure springs 22. Against opposite ends of each spring are seated the upper and lower dogs 23, 24 whose outer ends are normally in the outwardly flared seats 25, 26 in the adjacent faces of the upper and lower blocks 12, 13. When the dogs are seated in said seats the cams will be held in neutral position. As above stated when in said neutral position their outer surfaces will be flush with the outer surfaces of the corresponding slip segments and will bear against the seat 2 to form a supporting surface for the slips. When the cams are moved in either direction to active position the dogs will ride up on the flared faces of the seats 25, 26 but will not ride out of said seats so that when the torsional strain on the pipe is released the pressure of the dogs against the converging faces of the seats 25, 26 will be effective to move the cams to neutral position.

Figure 7:
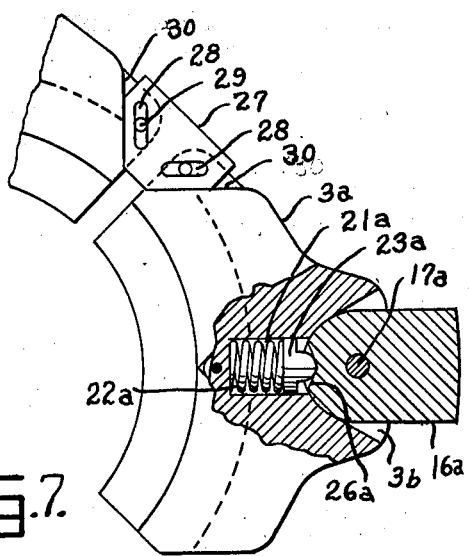
Figure 7 shows an enlarged, fragmentary top view.
Figure 5:
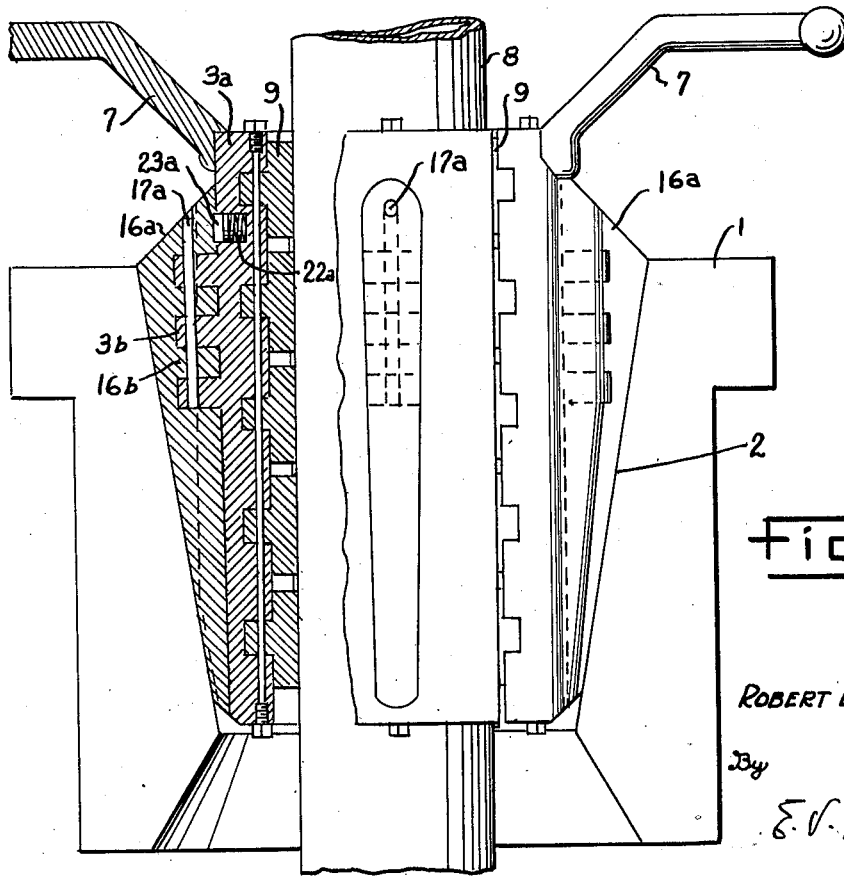
Figure 5 shows a side elevation of the slip, partly in section, mounted in the slip bowl and supporting the pipe and illustrating another embodiment.

In the embodiment illustrated in Figures 5 to 7, inclusive, each slip segment embodies an inner part 3a having an arcuate inside pipe engaging surface, and an outer part 16a having intermeshing tenons 3b and 16b having aligned bearings to receive the pivot pins 17a whereby said inner and outer parts of each segment are connected together to pivot on a longitudinal axis. The outer surface of the outer part is tapered downwardly to conform to the taper of and to fit closely within the seat 2 of the slip adapter 1. Upon an attempted rotation of the pipe 8 in the direction indicated by the arrow in Figure 6 a clamping action will be set up by the slip segment, the parts attempting to move in the directions indicated by the arrows in Figure 6 thus causing said pipe 8 to be clamped and held against turning relative to the slip adapter.

In the embodiment illustrated in Figures 5 to 7, inclusive, the slip segments are connected together but are open at one side 6 so that the assembly may be swung open in releasing the same from the pipe or closed together about the pipe and seated in the seat 2. The segments are connected together by the links 27 whose ends have outwardly diverging slots 28 and pins 29 are secured to the adjacent sides of the corresponding segments and work through said slots. This type of connection allows the segments to have a limited radial movement with respect to each other so that the slip will readily engage and hold pipes of different diameters.

It is to be noted that the facing sides of the segments have inwardly converging faces 30, 30 and the ends of the links 27 have their inner corners beveled off so as to conform to the taper of the faces 30. The ends of the links form stops arranged to co-act with the confronting faces 30 to limit the outward swinging movement of the segments when the slip is swung open. As the slip is swung open the pins 29 move to the outer ends of the slots 28 and the segments pivot about said pins, as the segments swing open, until the faces 30 contact against the opposing ends of the links 27. When the slip is swung into closed position about the pipe the segments may move radially inwardly until they engage the pipe, the pins 29 moving inwardly along the slots 28.

The inner part 3a of each slip segment has a deep socket 21a in which there is a coil spring 22a and also a dog 23a seated on said coil spring. The outer end of each dog is rounded off and is normally held seated in the outwardly flared seat 26a in the corresponding outer part 16a. When the dogs 23a are seated in said seats the outer parts 16a will be held in neutral position, that is, the outer surfaces of said outer parts 16a of the slip will lie in a common circle and will bear against the seat 2 to form supporting surfaces for the slips. Upon attempted rotation of the pipe, however, and corresponding relative movement of the parts 3a, 16a, the dogs 23a will ride up on the flared faces of the seats 26a but will not ride out of said seats so that when the torsional strain on the pipe is released, the pressure of the dogs against the converging faces of the seats 26a will be effective to move the outer parts 16a to their normal or neutral positions.

The drawings and description are intended to illustrate the principle of the invention without restricting the same to the precise forms shown except as restricted by the appended claims.

What I claim is:

1. A pipe holding slip shaped to fit into a slip seat and to surround a pipe through the seat, means housed within the outer side of the slip and pivotally connected thereto and engageable with the seat to prevent rotation of the slip in the seat and effective to cause radial inwardly pressure of the slip against the pipe held thereby.

2. A pipe holding slip shaped to fit into a downwardly converging seat and to surround a pipe through the seat, external locking means countersunk into the slip and normally in inactive position and movable radially outwardly relative to the slip into locking engagement with the seat upon relative rotative movement of the slip in the seat.

3. In a pipe holding slip shaped to be seated in a slip seat, an elongated external cam connected to the slip to pivot on a longitudinal axis and movable into active position into engagement with the seat, upon relative rotation of the slip in the seat to lock the slip with the seat and means for returning the cam to inactive, or neutral, position.

4. In a pipe holding slip shaped to seat in a downwardly converging slip seat and formed of segments; external locking means connected with each segment to pivot on longitudinal axes and positioned to engage the seat to transmit the torsional load of the pipe on the slips to the seat.

5. In a pipe holding slip shaped to fit the seat of a slip bowl and formed of segments having pipe gripping inner surfaces and tapered outer surfaces; means connected to each segment to pivot on a longitudinal axis and whose outer side is shaped to engage the seat to set up a clamping action to prevent rotation of a pipe, engaged by the slip, relative to the seat.

6. In a pipe engaging slip, a slip segment whose inner side is shaped to conform to the shape of a pipe and whose outer side is curved to conform to the shape of a slip seat, an elongated cam on the outer side only of the segment and whose inner side bears against the segment and whose outer side is shaped to conform to the shape of the seat, said cam being mounted to pivot about its longitudinal axis upon a turning movement of the segment in either direction about the axis of the pipe whereby to cause the cam to set up a clamping action to prevent rotation of the pipe relative to the seat.

7. A pipe holding slip shaped to be seated in a slip bowl seat and comprising a plurality of segments arranged to surround a pipe through the seat, each segment comprising an inner part having an inside pipe gripping surface engageable with the pipe and an outer part connected with the inner part to pivot on a longitudinal axis and whose outer side forms a face arranged to cooperate with the seat to set up clamping force to resist relative rotation of the pipe and seat.

8. In a device of the character described, a downwardly tapered seat having a cylindrical shaped member extending longitudinally therethrough, a slip having an inner part whose inner face is formed with a gripping surface to engage said member and having an outer part connected with the inner part to pivot on a longitudinal axis, said outer part being arranged to co-act with said seat and to clamp the same to resist relative rotation of said member and seat.

9. In a pipe holding slip, a slip segment comprising an inner part having an inside pipe gripping face engageable with a pipe and an outer part connected with the inner part to pivot on a longitudinal axis and whose outer side forms a face arranged to cooperate with a slip seat, means normally preventing relative movement of the parts and arranged to yield to allow such movement.

10. In a pipe holding slip shaped to fit the seat of a slip bowl and formed of segments having pipe gripping inner surfaces and tapered outer surfaces; means connected to some of the segments to pivot on a longitudinal axis and whose outer side is shaped to engage the seat to set up a clamping action to prevent rotation of a pipe, engaged by the slip, relative to the seat.

11. In a pipe holding slip shaped to fit into a slip bowl and to surround an inner pipe through the bowl; a slip segment having an inner pipe gripping surface and an outer tapered surface, the outer side of the segment being formed with a longitudinal groove whose inner side forms a semi-cylindrical bearing, a cam in the groove whose inner side is curved to snugly fit into said bearing and whose outer surface is approximately flush with the outer surface of the segment, means for pivotally connecting the upper and lower ends of the cam to the segment on an axis approximately concentric with said bearing.

12. In a pipe holding slip shaped to fit into a slip bowl and to surround an inner pipe through the bowl; a slip segment having an inner pipe gripping surface and an outer tapered surface, the outer side of the segment being formed with a longitudinal groove whose inner side forms a semi-cylindrical bearing, a cam in the groove whose inner side is curved to snugly fit into said bearing and whose outer surface is approximately flush with the outer surface of the segment, means for pivotally connecting the upper and lower ends of the cam to the segment on an axis approximately concentric with said bearing, and means normally maintaining the cam with its outer surface in flush relation with the outer surface of the segment.

13. In a pipe holding slip a slip segment having an inside slip engaging surface and a tapering outer surface and having an external, longitudinal groove whose inner side is formed into an approximately semi-cylindrical bearing, said groove being slightly flared outwardly, a cam in the groove mounted to pivot about an axis approximately concentric with the seat, the inner side of the cam fitting closely in said seat and the outer side of the cam being substantially flush with the outer side of the segment, means normally holding the cam against movement but being yieldable to permit the cam to rock about said axis.

14. In a pipe engaging slip a slip segment whose inner side is shaped to conform to the shape of a pipe and whose outer side is curved to conform to the shape of a slip seat, an elongated cam housed within the outer side only of the segment and whose inner side bears against the segment and whose outer side is approximately flush with the outer side of the segment, said cam being mounted to pivot about its longitudinal axis upon a turning movement of the segment in either direction about the axis of the pipe whereby to cause the cam to frictionally engage the seat.

ROBERT B. KINZBACH.